(12) United States Patent
Cheiky et al.

(10) Patent No.: US 6,582,851 B2
(45) Date of Patent: Jun. 24, 2003

(54) ANODE MATRIX

(75) Inventors: Michael Cheiky, Santa Barbara, CA (US); Wilson Hago, Ventura, CA (US)

(73) Assignee: Zinc Matrix Power, Inc., Santa Barbara, CA (US)

( * ) Notice: Subject to any disclaimer, the term of this patent is extended or adjusted under 35 U.S.C. 154(b) by 172 days.

(21) Appl. No.: 09/839,668

(22) Filed: Apr. 19, 2001

(65) Prior Publication Data

US 2002/0177040 A1 Nov. 28, 2002

(51) Int. Cl.[7] .............................. H01M 4/62; H01M 4/42
(52) U.S. Cl. ..................... 429/217; 429/229; 429/231; 429/232
(58) Field of Search .................... 429/217, 229, 429/231, 232

(56) References Cited

U.S. PATENT DOCUMENTS

| | | |
|---|---|---|
| 4,368,244 A | 1/1983 | Danzig |
| 4,778,737 A | 10/1988 | Sehm |
| 5,206,096 A | 4/1993 | Goldstein |
| 5,281,497 A | 1/1994 | Kordesh et al. |
| 5,348,820 A | 9/1994 | Suga et al. |
| 5,376,480 A | 12/1994 | Shinoda et al. |
| 5,382,482 A | 1/1995 | Suga et al. |
| 5,384,214 A | 1/1995 | Sugihara et al. |
| 5,464,709 A | 11/1995 | Getz et al. |
| 5,525,444 A | 6/1996 | Ito et al. |
| 5,686,204 A | 11/1997 | Bennet et al. |
| 6,495,289 B1 * | 12/2002 | Kawakami et al. .......... 429/229 |

FOREIGN PATENT DOCUMENTS

JP 56-143667 * 11/1981 ............. H01M/4/12

* cited by examiner

*Primary Examiner*—Patrick Ryan
*Assistant Examiner*—Angela J Martin
(74) *Attorney, Agent, or Firm*—Marvin E. Jacobs

(57) ABSTRACT

An anode paste material for use in zinc-based batteries that is designed to reduce zinc ion diffusion and resultant electrode shape change as well as zinc dendrite formation while optionally allowing for hydrogen permeability through the matrix comprising a regenerated cellulose film containing domains of hydrogen permeable polymer, particles of zinc and zinc oxide surrounded by hydrocarbon beads.

17 Claims, 2 Drawing Sheets

ANODE MATRIX

TECHNICAL FIELD

This invention relates to a paste material used in a rechargeable, alkaline, zinc-based battery and more particularly this invention relates to a matrix for zinc particles in an anode for a zinc-silver secondary battery.

BACKGROUND OF THE INVENTION

In modern electronics, there is a need for high performance, rechargeable batteries. A silver-zinc battery, having one of the highest energy densities both per unit weight and per unit volume plus extremely high discharge rates, appears to be an ideal solution to this need. However, a zinc-based battery has historically presented many challenges for the battery manufacturer. One of these challenges involves containing zincate diffusion within the battery. This is a particularly severe problem because zinc is extremely soluble in the strongly alkaline environments routinely used as the electrolyte in these types of batteries. The presence of $KZn(OH)_x$ where $x=1$ to 3 presents a double-edged sword for the battery designer. On the upside, the high solubility allows for rapid current spikes typically unattainable with other battery systems. However, this high solubility diffuses zinc ions into undesired locations within the battery. Upon re-plating, this zinc diffusion leads to the well-known phenomena of electrode shape change and the presence of zinc dendrites within the batteries. This shape change includes an agglomeration of the zinc towards the center of the battery while simultaneously depleting zinc from the edges. Dendrites can readily be formed due to the zinc concentration gradients within the battery. Their tree-like structures have as their most undesirable effect the rupture of the separator membranes leading to battery shorting.

Researchers in this area have tried various approaches to control the electrode shape change and to reduce the zinc dendrite formation. They can be classified into five different categories. The first approach involves taking into account the redistribution of zinc by starting out with zinc depleted at the center and agglomerated at the edges. The second approach attempts to deal with the issue by modifying the electric field experienced by the zinc so that the edges experience a stronger electric field than the center. A third approach involves attempts to decrease the solubility of the zinc by complexing it with other agents. The fourth approach involves attempts to contain the solubility of zinc by encapsulating it in a matrix, typically a matrix involving gelling agents. The fifth and final approach involves attempts to make a separator resistant to zinc dendrites. Encapsulation is the most promising of the approaches to improve anode performance.

STATEMENT OF THE PRIOR ART

Encapsulation has focused on using agents that swell easily in the presence of the electrolyte. In U.S. Pat. No. 5,686,204, Bennet et al use crosslinked CARBOPOL acrylic acid as a gelling agent possessing high absorbency. In U.S. Pat. No. 4,368,244 Danzig uses paste material composed of diacetone acrylamide and acrylic acid. Sehm in U.S. Pat. No. 4,778,737 teaches zinc surrounded by acrylamide and acrylate polymers.

Polyethylene oxide (PEO) has been disclosed in several patents as a gelling agent, including U.S. Pat. No. 5,384,214 by Sugihara et al who use a surfactant made of PEO and a perfluoroalkyl chain. Similarly, Getz et al in U.S. Pat. No. 5,464,709 use a methoxylated polyethylene oxide (Carbowax 550).

Still others have researched the use of crosslinked vinyl alcohols as preferred gelling agents. Thus, Ito et al in U.S. Pat. No. 5,525,444 disclose an electrode with a paste made from a vinyl alcohol crosslinked to a moiety containing COOX groups. Suga et al in U.S. Pat. No. 5,382,482 place zinc in direct contact with a crosslinked polymer, such as in the crosslinking of polyvinyl alcohol and dimethyldiethoxysilane.

Polyacrylic acid is used by Shinoda et al in U.S. Pat. No. 5,376,480 while Goldstein in U.S. Pat. No. 5,206,096 discloses a mixture of organic inhibitors and a gelling agent such as polyacrylic acid, carboxymethyl cellulose and hydrolyzed polyacrylonitrile. Kordesh et al in U.S. Pat. No. 5,281,497 teach crosslinked starch as the preferred gelling agent.

Finally, Suga et al in U.S. Pat. No. 5,348,820 suggest a polymer layer which is in contact with the zinc, said polymer having an oxygen permeability constant greater than $10^{-13}$ $cm^3$ $cm^{-1}s^{-1}Pa^{-1}$.

None of the above patents address certain peculiarities of zinc electrodes. First, there is the tendency of zinc to expel the gelling agent upon re-plating. This creates void spaces for zinc ion diffusion. Second, there are significant density changes when zinc is discharged to zinc oxide and vice versa. Finally, these patents do not address the hydrogen production that occurs during overcharge. All of these effects, acting separately and in concert, contribute to the breach of the initial zinc matrix.

STATEMENT OF THE INVENTION

The present invention provides a material that surrounds the zinc in a three-dimensional lattice matrix which induces the zinc to re-plate in the same mesh size as it was originally assembled. Second, the material has been designed to be mechanically stable despite zinc cycling. Third, the anode paste of the invention remains electrically interconnected during the entire charge cycle. Finally, the anode has high ionic transport, excellent accommodation to zinc density changes and, optionally, high hydrogen transport.

The material used as the anode paste component is of comparable grain size to the zinc particle grain size. When the paste is mixed with zinc, zinc oxide and electrolyte, the material is formed into a three-dimensional lattice matrix of comparable mesh size to the zinc mesh size, which serves to diminish electrode shape change as well as zinc dendrite formation. The occurrence of zinc ion diffusion is also minimized. The anode paste material contains polymer beads encapsulated by cellulose, and optionally, intermixed with a hydrophobic polymer of hydrogen permeability greater than $1 \times 10^{-13}$ $cm^3$ $cm^{-1}s^{-1}Pa^{-1}$.

The anode paste material contains cellulose as a gelling agent. Cellulose in the form of regenerated cellulose has been a widely used separator for zinc-based batteries. Some of the reasons for this include its low electrical impedance as well as its excellent ion transport in alkaline environments. In the presence of alkaline electrolyte cellulose can swell considerably. As a powder, cellulose is often used as a gelling agent. Cellulose is the principal constituent in the matrix material of the invention. Cellulose, with a degree of polymerization between 200 and 1200, can be used, so long as it is made soluble. This cellulose can also be crosslinked by a variety of methods.

Despite its advantages, cellulose is limited in its ability to accommodate zinc density changes and to transport hydrogen. If cellulose powder acts as the sole gelling agent, zinc ions readily permeate through the gel. Additionally, cellulose possesses one of the lowest hydrogen permeability coefficients of known polymers.

To compensate for these limitations, the anode matrix of the present is a two-component material that incorporates small hydrocarbon beads encapsulated in a cellulose matrix.

DETAILED DESCRIPTION OF THE INVENTION

Figure 1:
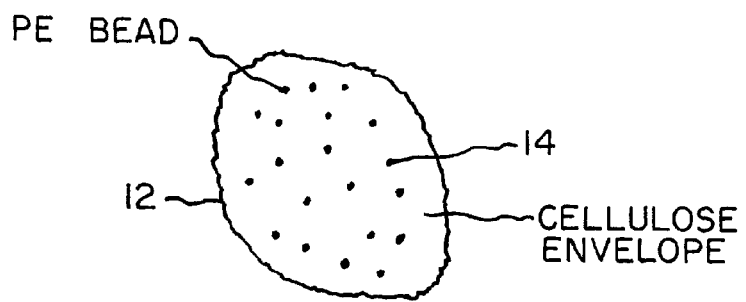
FIG. 1 is a schematic view of an anode matrix grain.
Figure 2:
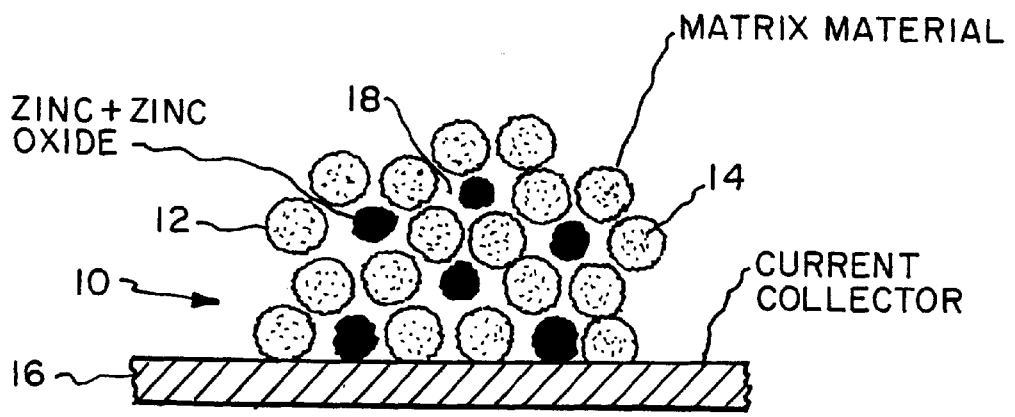
FIG. 2 is a schematic view of zinc and zinc oxide particles surrounded by the anode matrix material.
Figure 3:
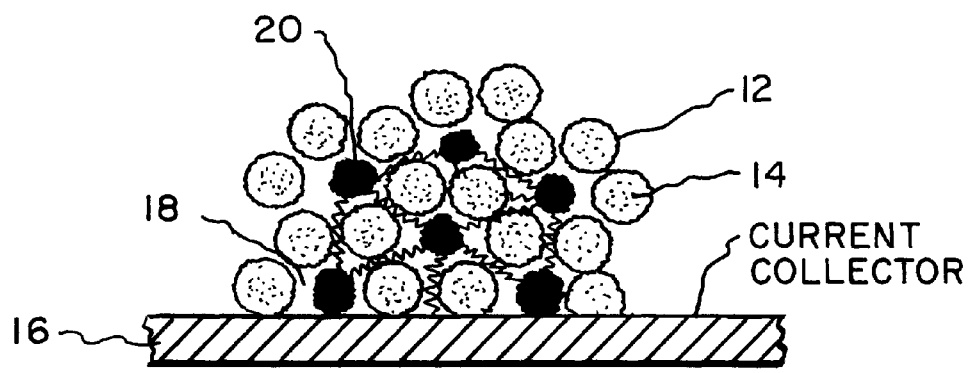
FIG. 3 is a schematic view of a network of zinc oxide particles on a current collector.

Referring now to FIGS. 1 and 2 the anode matrix paste is composed of a paste 10 of cellulose particles 12 which are cohesively joined, but interrupted with hydrocarbon beads 14 that are uniformly embedded within the particles. The paste 10 is pressed as a paste into a conductive support 16 such as a silver or copper screen or layer of extended metal. The hydrocarbon beads 14 mechanically reinforce the resulting anode matrix material 10. The beads 14 should be formed of a material that can withstand strongly alkaline environments, suitably a hydrocarbon aliphatic resin such as polyethylene or polypropylene. Additionally, the beads 14 should be small enough as to constitute part of a framework that maintains the original matrix grain size. Preferably, there should be between ten and fifty hydrocarbon beads 14 per zinc/zinc oxide matrix grain 20. As the zinc re-plates, these beads help to contain the zinc within the initial zinc grain cavities 18 as shown in FIG. 3.

The density of zinc, which is present when the battery is fully charged, is 7.14 while the density of zinc oxide, which is present when the battery is fully discharged, is 5.67. Thus, an agent is needed that conforms to the varying density of zinc while maintaining the zinc in place. Density changes are accommodated by using cellulose as a gelling agent.

To allow for hydrogen transport out of the zinc grains during fast charging, the anode material may optionally contain from 10 to 50% by weight of a hydrophobic polymer having a hydrogen permeability greater than $1 \times 10^{-13}$ cm$^3$ cm$^{-1}$s$^{-1}$Pa$^{-1}$. Substances possessing this permeability include, but are not limited to, ethyl cellulose, cellulose acetate, polymethyl pentene, polydimethyl siloxane, polyphenyl oxide, and gutta percha. The hydrophobic agent can be mixed with the cellulose component in the manner described in co-pending patent application, Serial No. 09/839,324 entitled RECOMBINANT SEPARATOR filed concurrently herewith (Attorney Docket No. 968-20-003), the disclosure of which is expressly incorporated by reference. In the three-component system of the invention, the polymeric beads are uniformly distributed throughout the sheet while the cellulose and hydrogen transport agent are phase separated. This phase separation allows for macroscopic behavior characteristic of the separate constituents. The cellulose and the hydrophobic agent are dissolved, either separately or concurrently, and the polymeric beads are added as a fine suspension to this medium. The material is then cast, coagulated, rinsed and dried.

To assure that zinc re-plates in the same mesh size as originally assembled, the material is ground to a particle size that approximates the zinc mesh size. The material then surrounds the zinc, forming a lattice that not only induces the zinc to remain in place, but also allows for ion movement out of the matrix, preventing hydrogen accumulation on the zinc surface and at the same time contracting and expanding in response to any changes in zinc density.

This invention works optimally when the matrix material is mixed with zinc and zinc oxide. Electrical connectivity needs to be maintained throughout the battery cycle. A totally discharged battery may lose all of its metallic zinc and fail to maintain properly arranged nucleation sites, thus leading to a tendency of the zinc to migrate outside of its initially established boundaries on subsequent cycles. However, a fully charged battery will convert all zinc oxide into zinc causing it to lose conductivity for the following reason. Zinc oxide, though a semiconductor, serves to interconnect all zinc grains via channels formed by coating the matrix material. The network of zinc oxide particles 20, shown as high impedance resistors in FIG. 3, should be maintained, particularly at the end of the charging cycle. Thus, a charging scheme is desired whereby the battery is charged between 10% and 90% of its total capacity. The battery should be cathode limited to stay within this range. Preferable mixing ratios of zinc oxide to zinc are in the range of 5 to 40% by weight.

EXAMPLE 1

40 grams of microcrystalline cellulose (MCC, Aldrich 31,069-7) is placed in solution of 2 kg of 5% LiCl/DMAC and heated to 120 degrees Celsius for 15 minutes. The cooled solution affords a clear solution of MCC. 50 grams of ethyl cellulose (EC) is dissolved in 1000 ml DMAC separately. MCC and EC solutions are combined in 2/1 weight ratio by dry polymer weight. 20 g of polyethylene beads (Quantum Inc.) are added and stirred for 15 minutes. 120 ml of the combined solution is placed on a 10×10 glass tray. A humidifier providing water over the glass tray yields a gelled product containing phases of MCC and EC and uniformly distributed polyethylene beads. This gel is then washed with water repeatedly until all DMAC and LiCl are removed. The gel is then dried, forming a sheet. This sheet is then ground via conventional means to obtain powder having a mesh size approximate to that of the zinc mesh size.

Figure 4:
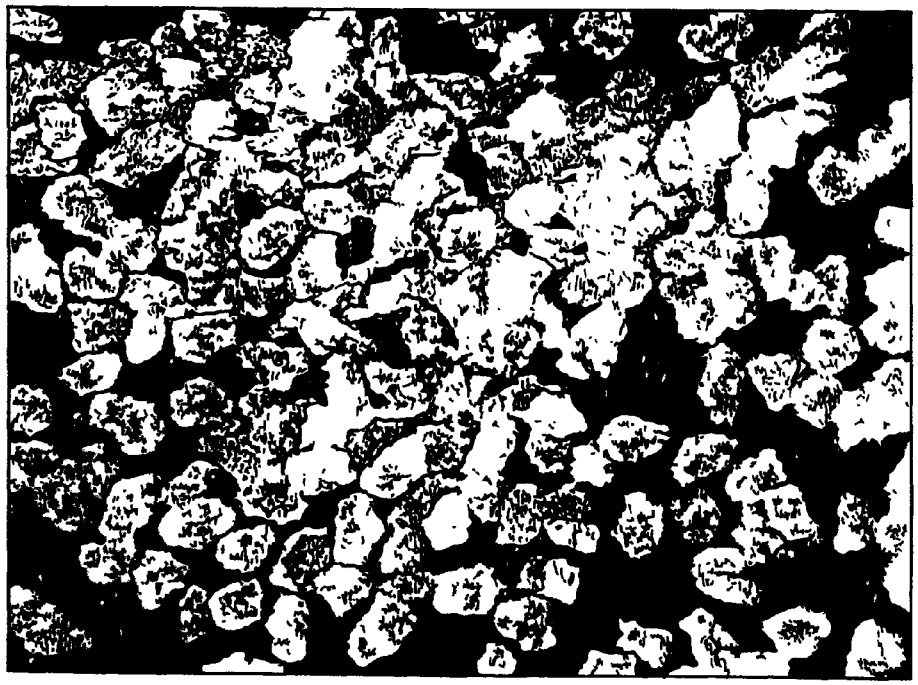
FIG. 4 is a micrograph of the matrix material.

A micrograph of the anode matrix material is shown in FIG. 4. Magnification is 20×.

A typical matrix material loading would be:

| | |
|---|---|
| Zinc | 25.2 g |
| Zinc oxide | 8.8 g |
| KOH (1.38 s.g.) | 10.5 g |
| Matrix Material | 1.5 g |

Above materials are combined into a paste and said paste is used as the negative electrode with a silver current collector.

Said sheet is tested for resistance to zinc migration as follows. A cavity with two compartments has a regenerated cellulose separator dividing the two compartments. One compartment contains 20 ml of a saturated amount of zinc in electrolyte while the other compartment has 20 ml of plain electrolyte. The migration of zinc from the saturated side of the zinc-free side is detected at stated time intervals via atomic absorption spectroscopy. Results reported are in ppm of Zn.

TABLE 1

| Minutes | Without Paste | With Paste |
|---|---|---|
| 30 | 600 | 240 |
| 60 | 760 | 260 |
| 400 | 15,200 | 8400 |
| 1400 | 38,000 | 25,000 |

EXAMPLE 2

40 grams of microcrystalline cellulose (MCC, Aldrich 31,069-7) is placed in a solution of 2 kg of 5% LiCl/DMAC and heated to 120 degrees Celsius for 15 minutes. The cooled solution affords a clear solution of MCC. The solution is reacted with 18 g of NaOH and 36 g diiododecane for 16 hours. 50 grams of ethyl cellulose (EC) is dissolved in 1000 ml DMAC separately. MCC and EC solutions are combined in a 2/1 weight ratio by dry polymer weight. 20 g of polyethylene beads (Quantum Inc.) are added. Material is then treated as in Example 1.

It is to be realized that only preferred embodiments of the invention have been described and that numerous substitutions, modifications and alterations are permissible without departing from the spirit and scope of the invention as defined in the following claims.

What is claimed is:

1. An anode paste for an alkaline battery comprising; cellulose particles and grains of metal anode material, said particles containing a dispersion of hydrocarbon beads and said particles surrounding said grains to form a supported cavity.

2. An anode paste according to claim 1 in which the paste further contains grains of semiconductive metal oxide forming a conductive path through the paste.

3. An anode paste according to claim 2 in which the metal is zinc.

4. An anode paste according to claim 3 in which the metal oxide is zinc oxide.

5. An anode paste according to claim 1 in which the cellulose particles film further contain polymeric domains of material having a hydrogen permeability of at least $10^{-13}$ $cm^3\ cm^{-1}s^{-1}Pa^{-1}$.

6. An anode paste according to claim 5 in which the hydrogen permeable material is present in an amount of 10 to 60 parts by weight per 100 parts of cellulose.

7. An anode paste according to claim 6 in which the hydrogen permeable material is selected from the group consisting of cellulose ethers, cellulose esters, polymethylpentene, polysiloxanes, polyphenylene oxides and hydrocarbon elastomers.

8. An anode paste according to claim 7 in which the hydrogen permeable material is ethyl cellulose.

9. An anode paste according to claim 1 which the hydrocarbon beads are selected from polyalkylene resins of monomers containing 2 to 8 carbon atoms.

10. An anode paste according to claim 1 in which the hydrocarbon beads are selected from the group consisting of polyethylene and polypropylene.

11. An anode paste according to claim 1 which the cellulose has a degree of polymerization from 200 to 1200.

12. An anode paste according to claim 1 in which 20 to 50 hydrocarbon beads per cellulose particle are present for each metal grain.

13. An anode paste according to claim 12 in which an anode grain comprises a dispersion of hydrocarbon beads in cellulose.

14. An anode paste according to claim 13 in which the anode grains are approximately the same size as the metal grains.

15. An anode paste according to claim 14 in which the anode grains form a lattice surrounding the metal and metal oxide grains.

16. An anode paste according to claim 3 in which the metal oxide is present in an amount of 5 to 40% by weight of the metal.

17. An anode paste according to claim 1 in which the matrix material is present in an amount of 1 to 15% by weight of the metal and metal oxide.

* * * * *